F. R. PHILLIPS & R. G. AVERILL.
VALVE.
APPLICATION FILED MAY 16, 1908.

931,797.

Patented Aug. 24, 1909.
3 SHEETS—SHEET 1.

F. R. PHILLIPS & R. G. AVERILL.
VALVE.
APPLICATION FILED MAY 16, 1908.

931,797.

Patented Aug. 24, 1909.

3 SHEETS—SHEET 2.

Witnesses
Fred A. Schlosser
Pearl Ackerman

Inventors
Frank R Phillips and
Rex G Averill
By John H. Cox
their Attorney

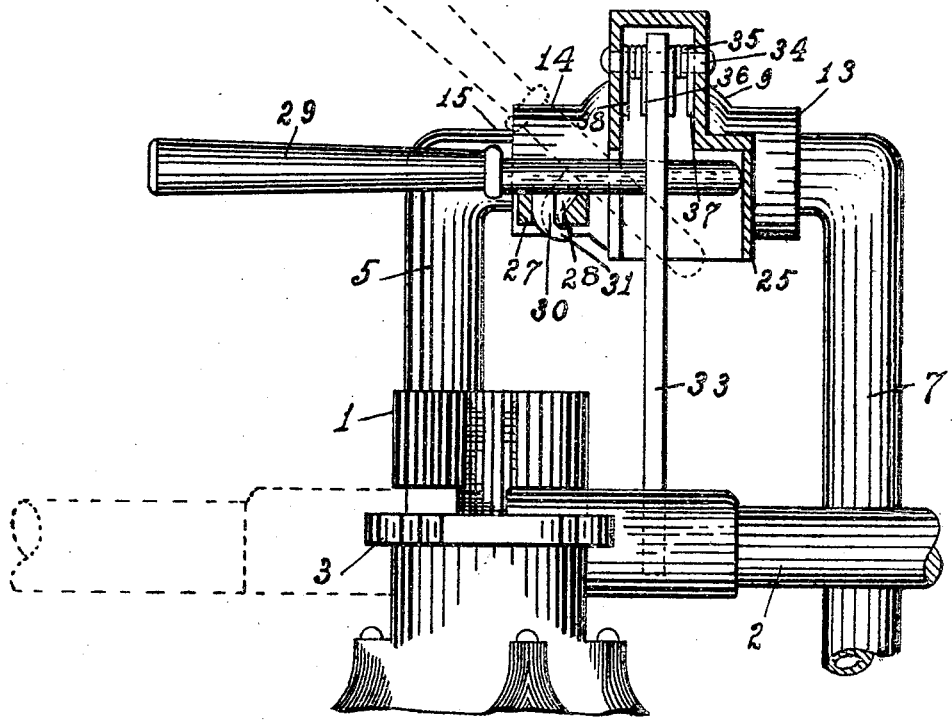

UNITED STATES PATENT OFFICE.

FRANK R. PHILLIPS AND REX G. AVERILL, OF MANSFIELD, OHIO, ASSIGNORS TO THE OHIO BRASS COMPANY, OF MANSFIELD, OHIO, A CORPORATION OF NEW JERSEY.

VALVE.

931,797.

Specification of Letters Patent.   Patented Aug. 24, 1909.

Application filed May 16, 1908.   Serial No. 433,205.

*To all whom it may concern:*

Be it known that we, FRANK R. PHILLIPS and REX G. AVERILL, citizens of the United States, residing at Mansfield, in the county of Richland and State of Ohio, have invented certain new and useful Improvements in Valves, of which the following is a specification.

Our invention relates to improvements in sander valves with means of operating the sander valve independent of or in conjunction with any type, style or size of engineer's air-brake valve.

One of the objects of our improvement is to provide a sander valve that is not physically connected to and forms no part of the engineer's air-brake valve but which can be operated in conjunction therewith or independent of said valve if desired.

A further object is to provide a sander valve that can be operated through the medium of the operating handle of the engineer's air-brake valve whether the operating handle is adapted to be moved in a horizontal or vertical plane.

A further object of our invention is to provide means of interlocking the operating lever of the sander valve with the lever that is operated through the medium of the operating handle of the engineer's air-brake valve and to provide means of automatically interlocking the operating lever of the sander valve with its operating mechanism or removing it therefrom.

A further object is to construct the operating means of the sander valve in such a manner as to afford facilities for the removal of the operating lever thereof which renders the valve inoperative until the operating lever is again connected to the operating means thereby preventing the operation of the valve by unauthorized persons.

Figure 1:
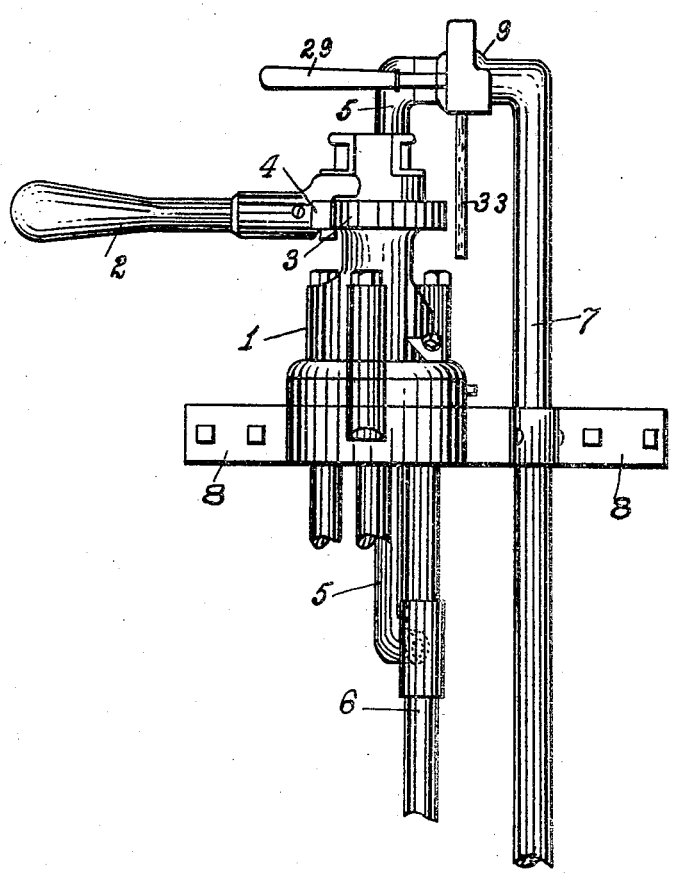
Figure 2:
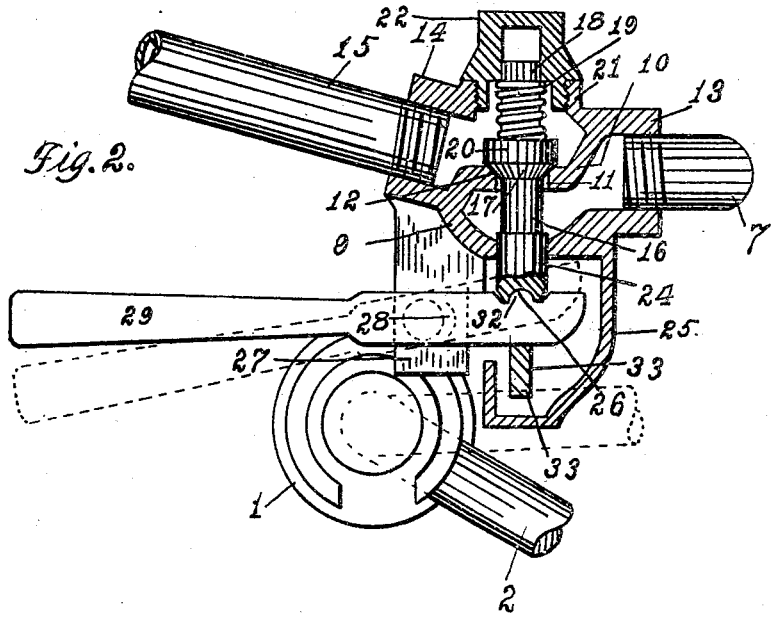
Figure 3:
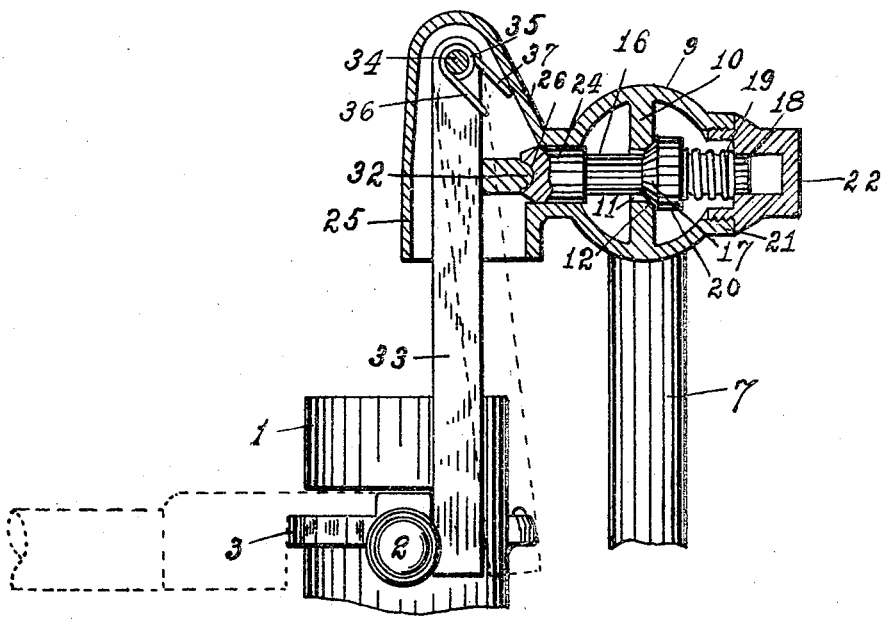

In the accompanying drawings Figure 1 is a side elevation of an engineer's air-brake valve showing the sander valve connected to and interposed between inlet and outlet pipes that are used for conducting the air from the reservoir to the sander trap (not shown). It also shows the oscillating lever of the sander valve depending in the path of the operating handle of the engineer's air-brake valve. Fig. 2 is a cross-sectional end view of the sander valve showing the operating handle of the engineer's air-brake valve and the operating lever of the sander valve in full and dotted lines. It also shows the operating mechanism of the sander valve. Fig. 3 is a vertical section of the sander valve showing the means of operating the sander valve through the medium of the operating handle of the engineer's air-brake valve which is shown in contact with the oscillating lever of the sander valve and in position to open the valve. Fig. 4 is an elevation of the sander valve partly in section showing the method of inserting or removing the operating lever and the means of pivotally supporting the oscillating lever with a spring contacting therewith under pressure.

Referring to the drawings, reference numeral 1 represents one type of engineer's air-brake valve and 2 indicates the operating handle which is adapted to be partially rotated in either a horizontal or vertical plane for different working positions. A disk 3 having notches or grooves formed in the periphery is secured to the upper portion of the valve. The operating lever 2 is provided with a spring actuated catch 4 which engages with the notches and retains the lever in any working position that the operator desires the operating handle to remain in.

A pipe 5 is connected to a pipe 6 which is in turn connected to the reservoir containing the air or other source of air supply. A pipe 7 leading to the sander trap is held in place by a bracket 8. The sander valve 9 is interposed between and connected to the inlet pipe 5 and outlet pipe 7 as shown in Fig. 1.

The construction of our sander valve is as follows: The valve body 9 is provided with a partition wall 10 having an aperture 11 provided therein upon which a valve-seat 12 is formed. A projecting portion 13 is formed thereon having a screw-threaded inner periphery and threadably connected to the pipe 7. A similar projecting portion 14 is formed on the valve body having a screw-threaded inner periphery to engage the pipe 15 which is in turn connected to the pipe 5. The projecting portion 14 is made at an incline to the body of the valve so as to give the operating lever of the sander valve (which will be described hereinafter) a longer sweep when movement is imparted to it by the operator, this however is not necessary under all conditions.

A valve-stem 16 is mounted within the valve casing and carries a valve 17 which is adapted to contact with the seat 12 formed in the valve body. A part 18 of the valve-stem is reduced below the diameter of the valve 17 to form a shoulder and a coil-spring 19 is placed upon said reduced portion with one end bearing against the enlarged portion 20 of the valve. The free end of the reduced portion 18 projects outwardly into a projecting tubular portion 21 formed on the valve-body. A cap 22 is threadably connected to the tubular portion to permit the reduced part of the valve-stem 18 to reciprocate therein and guide the valve-stem when motion is imparted to it through the medium of the operating lever 33. When the cap 22 is connected to the portion 21 of the valve it compresses the spring 19 which in turn exerts pressure against the enlarged portion 20 of the valve and normally holds the valve 17 in contact with its seat 12. The opposite end 24 of the valve-stem 16 is enlarged and passes out through a suitable aperture formed in the valve-body and extends into a hood or hollow casing 25 which is preferably made integral with the valve-body. A cone or similar shaped depression 26 is formed in the center of the enlarged portion 24 of the valve-stem. An outwardly extending table or support 27 is made integral with the valve-body and provided with an elongated aperture 28. The operating handle 29 of the sander valve is provided with a circular portion 30 with a lip 31 formed integral therewith.

The projecting portion 30 of the operating lever 29 is inserted in the aperture 28 as shown by dotted line in Fig. 4 and then moved to its proper working position as shown. The cone-shaped projecting portion 32 of the lever engaging with the cone-shaped depression 26 leaving the lip 31 resting against the lower portion of the table 27, thereby securely locking the operating lever 29 in place and permitting it to pivot upon the circular portion 30 to impart the necessary movement to the valve-stem to release the valve against the tension of the spring 19 when it is desired to permit the air to communicate with the sander trap.

An oscillating lever 33 depends or projects in such a direction as will permit it to come in the path of the operating handle 2 of the engineer's air-brake valve. The lever 33 swings or oscillates in the same manner as a pendulum but is held in place by a spring 35. The spring 35 is mounted on the pin 34 with the looped portion 36 engaging one edge of the oscillating lever 33 and the free ends 37 and 38 contacting with the inner wall of the hood under tension. This method of mounting the spring 35 upon the pin 34 provides a means of exerting a pressure against the depending lever and is used for the purpose of assisting the spring 19 in performing its functions.

As stated hereinbefore, the oscillating lever 33 is made to cross the path of the operating lever 2 of the engineer's air-brake valve, and when the operator grasps the operating handle 2 for the purpose of applying the brakes in emergency and at the same time to throw sand on the tracks it is necessary to rotate the lever 2 until it contacts as shown in Fig. 3 with the edge of the oscillating lever 33 forcing it to the position shown by the dotted lines counteracting the tension of the spring 19 and forcing the valve 17 from its seat and allowing the air to pass through the valve to the sander trap throwing sand upon the track.

When the operating lever 2 is returned to its normal working position, the spring 35 returns the oscillating lever 33 to its normal position automatically and the valve 17 is also automatically seated by the spring 19.

Attention is called to the fact that when the operating lever 29 is placed in its proper position, that the end of the lever is interlocked and interposed between the end of the valve-stem 24 and the edge of the depending lever 33 so that if it is desired to operate the sander valve independent of the engineer's air-brake valve, it is only necessary to move the operating lever 29 against the valve-stem and force it against the tension of the spring 19 and the air from the reservoir will pass through the sander valve to the sander trap for the purpose intended. If, however, it is desired to operate the sander valve and engineer's air-brake valve simultaneously or in conjunction with each other, the operating lever 2 of the valve is rotated until it comes in contact with the edge of the oscillating lever 33 and while the engineer's air-brake valve is being opened the sander valve is also being opened through the medium of the oscillating lever 33 which contacts with the operating lever 29 of the sander valve which in turn forces the valve 17 to unseat against the tension of the spring 19.

It will be apparent from the above description of the construction of the sander valve that it can be applied to and operated in conjunction with the engineer's air-brake valve of any type, class, size or design as it is only necessary to so place the oscillating lever 33 of the sander valve so that it will be in the path of the operating handle 2 of the engineer's air-brake valve and contact with it when it is rotated or moved, for the purpose of operating the valve to apply the air to the brakes.

Attention is further called to the fact that there is no physical connection between the sander valve and the engineer's air-brake valve.

When the operating lever 29 is removed, the sander valve can not be opened as there are no means of releasing the valve against the tension of the spring 19 when the lever is not interlocked and interposed between the valve stem and the oscillating lever.

Having fully described our invention, what we claim and desire to secure by Letters Patent is:

1. In a sander valve, a body provided with a casing, means to open and close the valve, an oscillating lever secured to the valve, a removable operating lever interposed between the oscillating lever and valve stem, both of said levers being adapted to be moved through the medium of the operating handle of the engineer's air brake valve.

2. In a sander valve, a body provided with a casing, a valve and stem mounted within the casing, an oscillating lever pivotally mounted on the casing, an operating lever pivotally and removably mounted on said body and interposed between the valve stem and oscillating lever.

3. In a sander valve, a body provided with a casing, a valve and stem mounted within the casing, an operating lever pivotally and removably mounted on said body and adapted to contact with the valve stem, an oscillating lever pivotally secured to the body and adapted to contact with the operating lever to open the valve when movement is imparted to it by the operating handle of the engineer's air brake valve.

4. In a sander valve, a casing provided with a partition wall, a valve stem carrying a valve mounted within the casing leaving one end projecting outside the casing, a hollow support formed on said valve casing, an operating lever pivotally secured to said support and adapted to contact and interlock with the projecting end of the valve-stem.

5. In a sander valve, a body having a hollow support formed integral therewith, a valve stem carrying a valve movably mounted within the valve body, an oscillating lever mounted in the hollow support, an operating lever interposed and removably interlocked between the stem of the valve and the oscillating lever.

6. In a sander valve, a body, a valve-stem mounted within the body, a valve secured to said stem, a spring to normally hold said valve to its seat, an oscillating lever secured to the valve body and adapted to contact with the operating lever of the sander valve, said operating lever having a circular portion divided thereon contacting with the end of the valve-stem, and means to movably lock them together.

7. In a sander valve having a hollow casing provided thereon, an operating lever removably mounted on said casing and adapted to open the valve, an oscillating lever also mounted on the casing; said levers being so arranged on the casing as to be operated independently or in conjunction with each other.

8. In a sander valve, a body having a hollow casing provided thereon, an oscillating lever secured to said casing, a spring mounted in the casing to engage with said lever, a support, an operating lever pivotally mounted on said support, means to open and close the valve as and for the purpose described.

9. In a sander valve, a body, an oscillating lever secured thereto, a valve-stem carrying a valve mounted in said body with one end projecting beyond the body, an operating lever removably interlocked in operative connection with said valve-stem.

In testimony whereof we affix our signatures in presence of two witnesses.

FRANK R. PHILLIPS.
REX G. AVERILL.

Witnesses:
G. A. MEAD,
W. H. WILLIAMS.